March 2, 1965    J. F. ZALESKI    3,172,106
SEMI-PASSIVE BEACON
Filed Dec. 22, 1960

INVENTOR.
JOHN F. ZALESKI

BY
ATTORNEY.

United States Patent Office 3,172,106
Patented Mar. 2, 1965

3,172,106
SEMI-PASSIVE BEACON
John F. Zaleski, Pleasantville, N.Y., assignor to General Precision, Inc., a corporation of Delaware
Filed Dec. 22, 1960, Ser. No. 77,690
6 Claims. (Cl. 343—101)

This invention relates to beacons of the kind which, in response to incident radio frequency energy, radiate a distinctive radio frequency signal.

Beacons may be classified as "active" beacons in which a local source of power such as a battery is required for their operation, or as "passive" beacons requiring no local power supply and which depend for their operation on power derived from the incident radio frequency field. The beacon of the present invention falls in a class between these two, sometimes referred to as "semi-passive," in which the only local power supply required is that which may naturally abound in the environment in which the beacon is placed. Such naturally occurring power supplies may be wind, wave or tidal motion, for example.

Beacons are used for a variety of purposes. For example, beacons may be installed at points of known position to aid air or marine traffic. The particular application will, of course, determine the type of beacon used. If size, weight, and the provision of a power supply are not a serious problem, active beacons may be constructed to serve complex functions. For example, they can be made to transmit a coded reply in response to a coded interrogation.

Active beacons have the obvious disadvantages of size, weight and power supply requirements. Passive beacons usually require the use of semiconductor devices such as diodes and transistors and their associated circuitry. Additionally, passive beacons usually require that a definite threshold level of radio frequency power be incident on the beacon in order to initiate its operation.

It is a general object of the present invention to provide an improved semi-passive beacon.

Another object is to provide a beacon requiring no semi-conductor devices.

Another object is to provide a beacon requiring no power supply other than the incident radio frequency energy and such power as may naturally abound in the environment.

Another object is to provide a beacon operable with very low levels of incident radio frequency energy and not dependent upon a threshold power level.

Briefly stated, the invention comprises a two pronged conductive fork capable of vibrating mechanically, preferably at an audio frequency. A conductive stud is mounted on the free end of each prong, the studs extending toward but not touching each other. The two prongs of the fork, in addition to vibrating mechanically, constitute the two conductors of a parallel resonant transmission line, short circuited at one end by the base of the fork and shunted at the other end by the capacitance between the studs. This capacitance varies as the fork vibrates thereby varying the resonant frequency of the transmission line slightly. Accordingly, radio frequency energy of the proper frequency incident on the fork is phase and amplitude modulated at the vibration frequency and reradiated.

For a clearer understanding of the invention reference may be made to the following detailed description and the accompanying drawing, in which.

Figure 1:
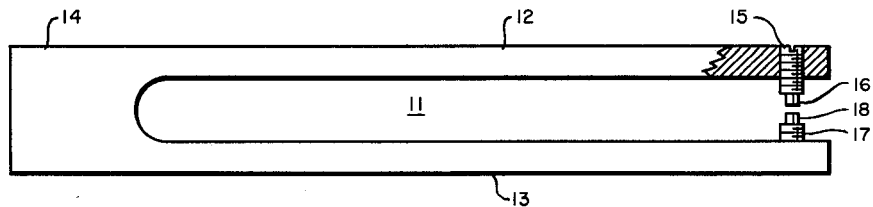
FIGURE 1 is a front elevation view, partly in section, of a preferred embodiment of the invention.
Figure 2:
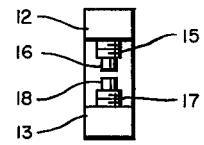
FIGURE 2 is a side elevation view taken from the right side as viewed in FIGURE 1.

Referring first to FIGURE 1, the beacon of the invention is denoted generally by the reference character 11 and comprises a generally U-shaped body made of conductive, resilient material or may be constructed of non-conductive material such as quartz or plastic and subsequently conductively coated with a metallic plating. More specifically, the elongated or leg portions of the U constitute tines or prongs 12 and 13 formed integrally with a base portion 14 to form a fork. As shown in FIGURE 2, each of the prongs 12 and 13 is of rectangular shape and the assembly is capable, when set in motion, of vibrating like a tuning fork with the prongs 12 and 13 alternately approaching and receding from each other.

A screw or stud 15 is threaded through an aperture in the prong 12 near its free end and has a reduced diameter portion 16 which extends toward the prong 13. A similar stud 17 is threaded through an aperture in the prong 13 near its free end and has a reduced diameter portion 18 which extends toward but does not touch the stud 15. The reduced diameter portions 16 and 18 have flat, substantially planar end faces perpendicular to the axis of the studs 15 and 17. The spacing between the faces is small, but large enough so that they do not touch when the fork vibrates.

The prongs 12 and 13 also constitute the two conductors of a parallel conductor resonant transmission line, short circuited at one end by the base portion 14 and shunted at the other end by the capacitance between the studs 15 and 17. In the absence of mechanical vibration, this line has a normal resonant frequency which, however is varied when the fork vibrates.

Figure 3:
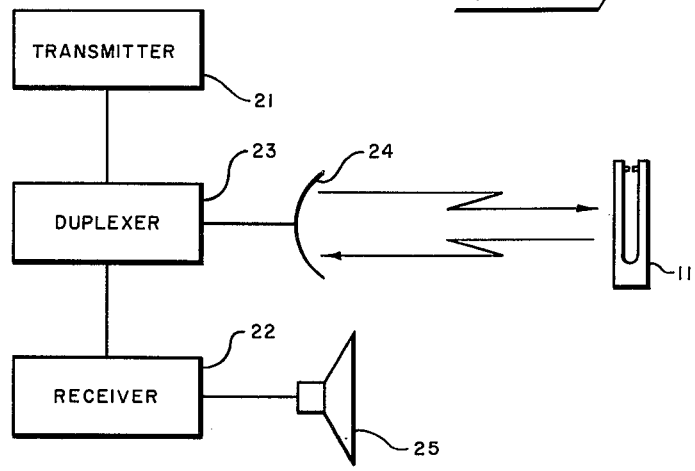
FIGURE 3 is a schematic block diagram showing how the invention is used.

FIGURE 3 shows how the beacon of the invention is used. There is shown a transmitter 21 and a receiver 22 interconnected by a duplexer 23 to a directional antenna 24, schematically shown as a paraboloid. The receiver 22 is provided with a loudspeaker 25. Continuous wave radio frequency energy at the resonant frequency of the transmission line comprised of prongs 12 and 13 is directed to the beacon 11. The line resonates and a portion of the radio frequency energy is reradiated. When the fork comprised of prongs 12 and 13 and the base 14 is set in vibration as by striking, the capacitance between the studs 15 and 17 is varied thereby varying the resonant frequency of the transmission line and causing the reradiated energy to be modulated at the vibratory frequency. The receiver 22 recovers the modulation which is converted to an audible signal by the loudspeaker 25.

The radio frequency resonance may be chosen by selecting the length of the prongs 12 and 13 in accordance with well known principles. The variation in resonant frequency may be adjusted by selecting the diameter of the end portions of the studs which constitute the shunt capacitance. The spacing between studs is preferably as small as possible consistent with clearance during vibration. The mechanical vibratory frequency may be adjusted by suitably selecting the resilience of the material and the length and cross section of the prongs 12 and 13.

A specific embodiment has been constructed and tested for use with radio frequency energy in the 400 mc. band. This embodiment was made from a bar of aluminum alloy one inch wide and 3/8" thick. Overall length was 7½" and the length of each of the prongs 12 and 13 from their free ends to their junction with the base portion 14 was 6¼". Each prong was ¼" wide by 3/8" thick and the spacing between prongs was ½". The studs 15 and 17 were located approximately ¼" from the end of the prongs and the portions 16 and 18 had a diameter of approximately 0.05." Spacing between studs, in the absence of vibration, was approximately 0.003." The mechanical vibratory frequency was about 250 cycles per second.

The specific embodiment as above described was tested by holding or placing it in the beam from the antenna 24, FIGURE 3. When the prongs were held so as to prevent vibration, no tone issued from the loudspeaker 25. When vibration was induced, as by striking one of the prongs gently, a tone of about 250 c.p.s. was heard from the loudspeaker.

It has been found that very little energy is necessary to induce vibration. A short burst of air blown from the mouth is sufficient to start vibration which lasts for 10 or 20 seconds. Alternatively, a gentle moving of the beacon while held in the hand by the base 14 is sufficient.

It is obvious from the above that the beacon 11 will operate if installed where there is a breeze blowing. As another example, the beacon may be installed on a buoy in a harbor where the ever present wave motion will be sufficient to sustain vibration.

There is no threshold level of radio frequency power required to be incident on the beacon 11 in order to initiate operation. Providing that the fork be vibrating, any level of radio frequency power at the resonant frequency incident on the beacon will be modulated and partially reradiated. The lower limit of incident power at which the beacon will operate is not determined by the characteristics of the beacon but is determined by the sensitivity and the signal-to-noise ratio of the receiver.

Although a specific embodiment has been described for illustrative purposes, many modifications will occur to those skilled in the art. It is therefore desired that the protection afforded by Letters Patent be limited only by the true scope of the appended claims.

What is claimed is:

1. A beacon, consisting of, a generally U-shaped, resilient, conductive body, including two leg portions and a base portion, whereby said body has a mechanical resonant frequency at which it is capable of vibrating in a mode in which the free ends of said leg portions alternately approach and recede from each other and whereby said leg portions constitute a two conductor quarter wavelength electric transmission line short circuited at one end by said base portion and open at the other end, and a pair of conductive members one fastened to each of said leg portions at corresponding positions near the free ends thereof, said members extending toward but not touching each other for causing a variation in the capacitance between said leg portions in response to vibration of said body and for causing a corresponding variation in the resonant frequency of said transmission line.

2. A beacon for modulating and reradiating incident electromagnetic wave energy of a predetermined frequency, consisting of an electrically conductive two pronged fork capable of vibrating mechanically, each prong of said fork having a length equal to one-quarter of the free space wavelength of said energy of predetermined frequency, and two conductive studs, one fastened to each prong near the extremity thereof and extending toward the other stud, said studs constituting the plates of a variable capacitor.

3. A beacon for modulating and reradiating incident electromagnetic wave energy of a predetermined frequency, consisting of an electrically conductive two pronged fork capable of vibrating mechanically, each prong of said fork having a length equal to one-quarter of the free space wavelength of said energy of predetermined frequency, whereby said fork acts as a transmission line closed at one end and open at the other and resonant at said predetermined frequency, and two conductive studts, one fastened to each prong near the extremity thereof and extending toward the other stud for forming a variable capacitor, whereby mechanical vibration of said fork varies the spacing between said studs, the capacitance therebetween, and the resonant frequency of said transmission line.

4. A beacon for modulating and reradiating incident electromagnetic wave energy of a predetermined frequency, consisting of, a two conductor transmission line having an open end and a closed end, said closed end comprising a block of conductive material, each of said conductors comprising an extension of said block, said conductors extending parallel to each other and each having a length equal to one quarter of the free space wavelength of said energy of predetermined frequency, the assembly comprising said conductors and said block being made of a resilient material, whereby said assembly has a mechanical resonant frequency at which it is capable of vibrating in a mode in which said conductors alternately approach and recede from each other, and two conductive studs, one fastened near the free end of each of said conductors, said studs being axially aligned and extending toward but not touching each other for forming a variable capacitor, whereby said open end of said transmission line is shunted by the capacitance between said studs and whereby vibration of said assembly causes an alternate approach and recession of said studs, a variation in the capacitance therebetween, and a variation in the resonant frequency of said transmission line.

5. Apparatus of the class described, comprising, a radio frequency transmitter, a radio frequency receiver, a directive antenna, a duplexer interconnecting said transmitter, said receiver and said antenna, said transmitter, said receiver and said antenna being designed to operate at the same predetermined frequency, and a remotely located beacon, said antenna being directed toward said beacon, said beacon consisting of a resilient conductive body in the form of a fork having first and second prongs joined together at one end by a base formed integrally therewith, each prong of said fork having a length equal to one quarter of the free space wavelength of energy at said predetermined frequency, each of said prongs being provided with a conductive stud fastened to the free end thereof, said studs being axially aligned and extending toward but not touching each other.

6. Apparatus of the class described, comprising, a radio transmitter, a radio receiver, a directive antenna, a duplexer interconnecting said transmitter, said receiver and said antenna, said transmitter, said receiver and said antenna being designed to operate at the same predetermined frequency, and a remotely located beacon for receiving, modulating, and reradiating energy of said predetermined frequency incident thereon, said antenna being oriented to direct energy toward said beacon, said beacon consisting of an electrically conductive two pronged fork capable of vibrating mechanically, each prong of said fork having a length equal to one quarter of the free space wavelength of said energy of said predetermined frequency, and two conductive studs constituting the plates of a capacitor, one fastened to each prong near the extremity thereof and extending toward the other stud.

References Cited by the Examiner
UNITED STATES PATENTS

| | | | |
|---|---|---|---|
| 2,152,955 | 4/39 | Coyne | 333—71 |
| 2,212,110 | 8/40 | Beuermann | 343—101 |
| 2,238,268 | 4/41 | Kautter | 343—101 |
| 2,461,005 | 2/49 | Southworth | 343—18 |
| 2,812,427 | 11/57 | Magondeaux | 343—101 |
| 2,928,308 | 3/60 | Godbey | 331—156 |

CHESTER L. JUSTUS, *Primary Examiner.*